(12) United States Patent
Winn et al.

(10) Patent No.: US 12,143,359 B2
(45) Date of Patent: Nov. 12, 2024

(54) DNS RESOLVER-ASSISTED DOMAIN NAME-BASED ACCESS CONTROL

(71) Applicant: Cisco Technology, Inc., San Jose, CA (US)

(72) Inventors: Adam Gregory Winn, Lincoln, CA (US); Jeffrey Gino Fanelli, Clarkston, MI (US); Brian Levin, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 876 days.

(21) Appl. No.: 17/194,622

(22) Filed: Mar. 8, 2021

(65) Prior Publication Data

US 2022/0286431 A1   Sep. 8, 2022

(51) Int. Cl.
*H04L 29/06* (2006.01)
*H04L 9/40* (2022.01)
*H04L 29/12* (2006.01)
*H04L 61/4511* (2022.01)
*H04L 61/5007* (2022.01)

(52) U.S. Cl.
CPC ...... *H04L 63/0236* (2013.01); *H04L 61/4511* (2022.05); *H04L 61/5007* (2022.05); *H04L 63/20* (2013.01)

(58) Field of Classification Search
CPC . H04L 63/0236; H04L 63/20; H04L 61/5007; H04L 61/4511
See application file for complete search history.

(56) References Cited

U.S. PATENT DOCUMENTS

| | | | |
|---|---|---|---|
| 8,122,493 B2 | 2/2012 | Drako et al. | |
| 9,503,424 B2 | 11/2016 | Bharali et al. | |
| 9,571,452 B2 | 2/2017 | Salcedo | |
| 10,560,480 B1 | 2/2020 | Sirigiri et al. | |
| 2010/0303009 A1* | 12/2010 | Liu | H04W 48/17 370/328 |
| 2017/0180402 A1* | 6/2017 | Finnig | G06F 21/563 |
| 2018/0351972 A1* | 12/2018 | Yu | H04L 63/1416 |
| 2019/0081958 A1* | 3/2019 | Lee | H04L 63/145 |
| 2020/0186499 A1* | 6/2020 | Benjamin | H04L 61/4511 |

FOREIGN PATENT DOCUMENTS

KR        101428999 B1    8/2014

* cited by examiner

*Primary Examiner* — Noura Zoubair
(74) *Attorney, Agent, or Firm* — Lee & Hayes, P.C.

(57) ABSTRACT

A domain name system (DNS) resolver includes a processor and a non-transitory computer-readable media storing instructions that, when executed by the processor, causes the processor to perform operations including receiving, from a client device, a request for an internet protocol (IP) address associated with a domain name, determining the IP address associated with the domain name, sending first data defining the IP address associated with the domain name to the client device, and sending second data defining the IP address associated with the domain name to a firewall device, the second data including an identification of the client device.

17 Claims, 9 Drawing Sheets

600 ⇀

```
┌─────────────────────────────────────────────────────────────┐
│ RECEIVE, FROM A CLIENT DEVICE, A REQUEST FOR AN IP ADDRESS  │
│                ASSOCIATED WITH A DOMAIN NAME                │
│                            602                              │
└─────────────────────────────────────────────────────────────┘
                              │
                              ▼
┌─────────────────────────────────────────────────────────────┐
│      DETERMINE THE IP ADDRESS ASSOCIATED WITH THE DOMAIN    │
│                             NAME                            │
│                             604                             │
└─────────────────────────────────────────────────────────────┘
                              │
                              ▼
┌─────────────────────────────────────────────────────────────┐
│ SEND DATA DEFINING THE IP ADDRESS ASSOCIATED WITH THE DOMAIN│
│                    NAME TO THE CLIENT DEVICE                │
│                            606                              │
└─────────────────────────────────────────────────────────────┘
                              │
                              ▼
┌─────────────────────────────────────────────────────────────┐
│ SEND A COPY OF THE DATA DEFINING THE IP ADDRESS ASSOCIATED  │
│ WITH THE DOMAIN NAME TO A FIREWALL DEVICE, THE COPY OF THE  │
│    DATA INCLUDING AN IDENTIFICATION OF THE CLIENT DEVICE    │
│                            608                              │
└─────────────────────────────────────────────────────────────┘
```

DNS RESOLVER-ASSISTED DOMAIN NAME-BASED ACCESS CONTROL

TECHNICAL FIELD

The present disclosure relates generally to network security. More specifically, the present disclosure relates to domain name-based access controls within a domain name (DN) server. The domain name-based access controls are applied via a network firewall and assisted by a domain name system (DNS) resolver to identify relationships between domain names and internet protocol (IP) addresses related to DNS query requests.

BACKGROUND

A firewall is a network security system that monitors and controls incoming and outgoing network traffic based at least partially on a number of access policies (e.g., rules) defined by, for example, an administrator of the network. In some instances, an administrator may seek to ensure that client devices do not access unauthorized internet protocol (IP) addresses and the data and/or services provided by the devices (e.g., servers) located at the unauthorized IP addresses. Unauthorized IP addresses may include any IP address an administrator seeks to restrict access to including untrusted, unverified, malicious, deceitful, or otherwise undesirable IP address. Stated another way, an unauthorized IP address may include any web page, computing resource, software or other executable or non-executable data that is not approved or allowed. The administrator may create access policies defined within the firewall to instruct the firewall to allow all IP addresses to be accessed via outgoing traffic from a client device except those explicitly included within a blacklist and/or including those explicitly included within a whitelist.

A domain name system (DNS) may be employed to allow a user to more conveniently navigate a network such as the Internet, as well as to allow an administrator of a firewall to enter the relatively more easily-remembered domain names. A DNS, in both internet protocol version 4 (IPv4) and internet protocol version 6 (IPv6), is a hierarchical and decentralized naming system for computers, services, or other resources connected to the Internet or a private network that associates, for example, domain names assigned to each of the participating entities with numerical IP addresses. The DNS may translate more readily memorized or user-identifiable domain names to the numerical IP addresses needed for locating and identifying computer services and devices with the underlying network protocols, and provide a worldwide, distributed directory service for the Internet and other networks. Stated another way, a DNS serves as a phone book for the Internet by translating human-friendly computer hostnames or domain names into IP addresses. By providing a worldwide, distributed directory service, the DNS allows large networks including the Internet to function in a user-friendly manner by providing a more user-manageable nomenclature for IP addresses.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example method for performing a DNS resolver-assisted domain name-based access control within a firewall device, according to an example of the principles described herein.

DESCRIPTION OF EXAMPLE EMBODIMENTS

Figure 1:
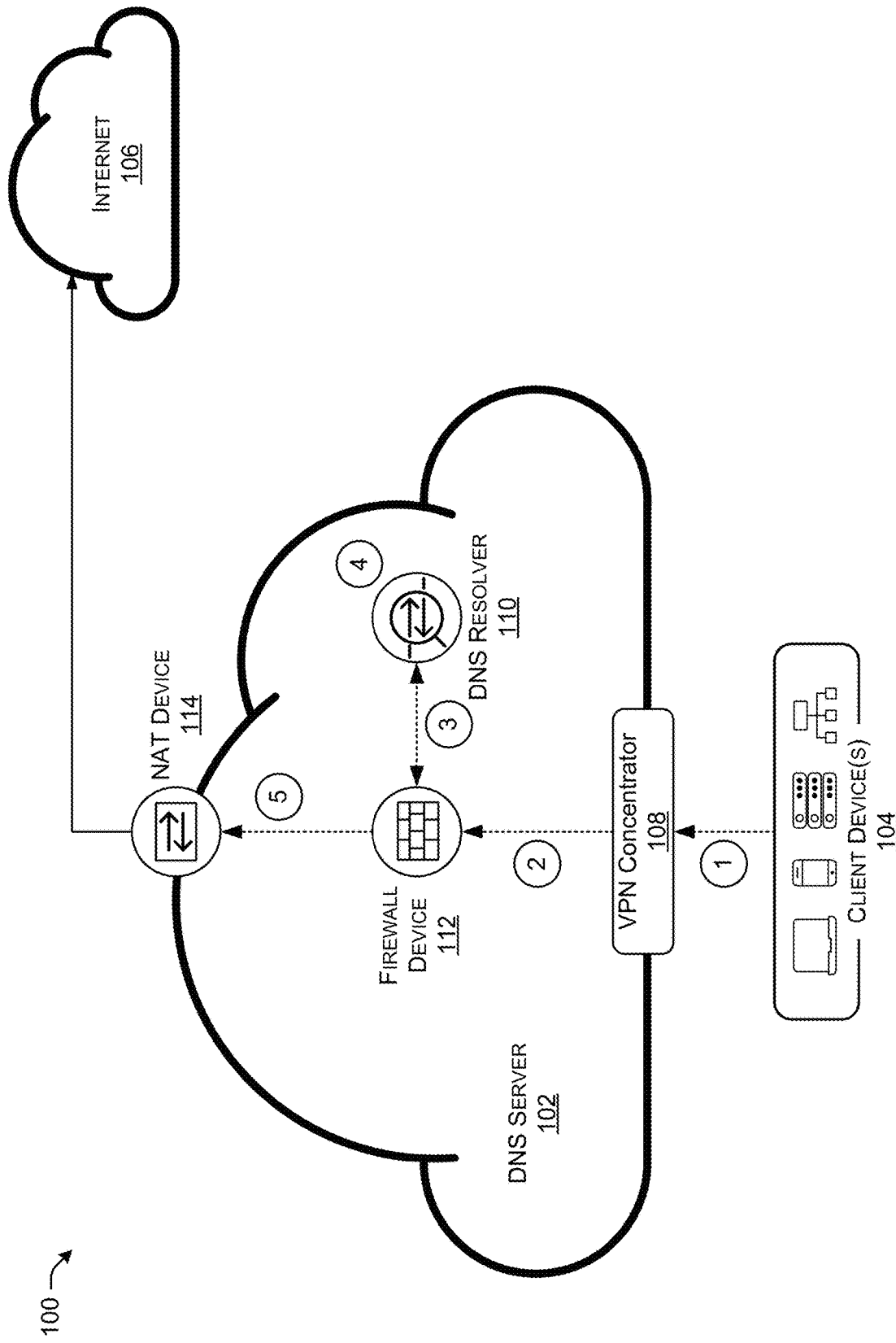
FIG. 1 illustrates a system-architecture diagram of a domain name system (DNS) server and associated firewall traffic call flows, according to an example of the principles described herein.

A network such as the Internet maintains two principal namespaces, the domain name hierarchy and the IP address spaces. The DNS maintains the domain name hierarchy and provides translation services between it and the address spaces using, for example, a network address translation (NAT) process that remaps an IP address space into another by modifying network address information in the IP header of data packets while they are in transit across a traffic routing device. In one example, a DNS server may store DNS records for a number of domains and may provide answers to queries against its database.

As noted above, the firewall may include a blacklist and/or whitelist for IP addresses that a client device may and may not access in outgoing traffic. These blacklists and whitelists may be referred to herein generally as access policies that define accessible IP addresses. The firewall may receive a request from a client device to access, by way of example, IP address 93.184.216.34 for Internet Protocol version 4 (IPv4) and 2606:2800:220:1:248:1893:25c8:1946 for Internet Protocol version 6 (IPv6) which translates into the domain name "www.example.com." The IP address for IPv6 version of www.example.com (e.g., 2606:2800:220:1:248:1893:25c8:1946) will be referred to herein by way of example. If the example IP address 2606:2800:220:1:248:1893:25c8:1946 is included within a access policy, the firewall will detect the example IP address 2606:2800:220:1:248:1893:25c8:1946, and restrict the client device from sending or allow the client device to send packets to that example IP address 2606:2800:220:1:248:1893:25c8:1946 based on the access policy. However, the firewall may only utilize the IP address in creating access policies and may not consider the domain name (e.g., www.example.com) that corresponds to the IP address. The administrator may not be familiar with the IP address of the domain name www.example.com since the IP address is a forgettable or unintelligible series of numbers. Thus, an administrator may not be able create an access policy within the firewall based on the domain name www.example.com. Stated another way, the administrator may find it difficult or impossible to create access policies for a firewall based on domain names in situations where the IP address is unknown for the domain name.

Further, in some examples, a firewall may be able to perform packet inspection when receiving a DNS query request from a client device. Packet inspection or snooping of the data packet allows for the firewall to inspect the data packet to parse out the data packet and find the associated domain name for the IP address of the data packet. This would allow the firewall to implicitly but not explicitly correlate the IP address in the header of the data packet with the parsed domain name. However, this process is complicated in that it requires sophisticated deep packet inspection processing and may require decryption processes if the packet is encrypted. Further, not all data packets contain the domain name corresponding to the IP address. For example, hypertext transfer protocol (HTTP) does include this information, but other Internet protocols such as, for example, file transfer protocol (FTP) and secure shell (SSH) protocol do not include the domain name in the data packet. This makes it impossible for the firewall to ascertain the domain name within the data packet without some form of outside information provided to the firewall.

Still further, even if the firewall device were able to perform packet inspection in order to determine a domain name of the IP address associated with the data packet, the firewall device still would not explicitly know that a particular DNS query request sent by a client device corresponds to a particular DNS resolution process and its results provided by a DNS resolver of a DNS server. This is because a client device and/or a DNS server may maintain a DNS cache. The DNS cache is a temporary storage of information about previous DNS resolution processes on client device's operating system (OS) or web browser. Keeping a local copy of a DNS resolution process and its results allows the OS or browser of the client device or the DNS server to quickly retrieve the information, and, in this manner, a domain name for the desired website can be resolved to its corresponding IP address more efficiently. However, a DNS server and/or a firewall may have access policies dictating allowed and restricted IP addresses. However, this list is not updated at a frequency or rate that it can be trusted as an accurate list that reflects the DNS cache of the client device and/or the DNS server. This is because the DNS servers may change their DNS resolution process result databases at any time and without notice to the firewall. Further, different DNS servers may include different DNS resolution process result databases, and may even provide different answers to DNS queries to different client devices due to load balancing, DNS server mirroring, etc.

A firewall device may perform a DNS resolution process to determine a relationship between a number of fully qualified domain names (FQDN) and a number of IP addresses. In this example, the firewall device may use this information to interpret an administrator's desire to allow or deny access to the FQDN, by dynamically creating IP address-based access policies. Thus, a firewall device may solve the issue of mapping a domain name to an IP address by periodically performing a DNS resolution process to mimic what a client device may perform. The firewall device, in this example, may build its own DNS cache and dynamically add any additional information to an access policy created by an administrator to, in an imprecise manner, map the traffic to the IP addresses. However, because the relationship between FQDN and IP address(es) is dynamic, the firewall device, as a consequence, may undesirably allow access to IP address(es) that are no longer associated with the FQDN or otherwise perform the DNS resolution process at a frequency short enough to not miss changes in the domain name/IP address mapping.

Further, in examples where the firewall device performs a DNS resolution processing to determine the relationship between the FQDNs and IP addresses, it is impossible for the administrator to specify an access policy for an entire parent zone. For example, because of this, the administrator may not create the access policy "allow example.com and all of its subdomains" since the firewall administrator must know and explicitly enter all of the subdomains of the parent domain. This access policy directed to a parent domain and its subdomains is referred to as a wildcard access policy. A wildcard access policy is any access policy created by an administrator at the firewall that matches requests for non-existent domain names in a DNS zone. For example, a wildcard access policy for the firewall may include an "*" or other truncating wildcard notation as a leftmost label or part of a domain name. In the example provided herein of "www.example.com," a wildcard may include "*.example.com." Thus, the wildcard access policy may utilize "*.example.com" to capture all unknown and/or non-existent domain names within the www.example.com domain. Thus, in this example, the firewall device may perform DNS resolution process on domain names ending in "example.com" that do not exist. Thus, a DNS resolution process for somerandomname.example.com may return a record pointing to "host1.example.com," for example.

In some situations, it may prove difficult to determine how long records with the DNS cache are maintained. For example, the IP address the client device is using to access services over a web service may change in, for example, five minutes. A time to live (TTL) value may be applied to the data or records within the DNS cache to define the lifespan or lifetime of the data or records. The TTL value prevents the access policy from becoming too broad (e.g., too lenient). For example, the IP address the client device is using to access a destination via a web service may change within or after the five-minute TTL value. In this case, the IP address may actually direct the client device to an unknown and possibly malicious destination. If the firewall still has that IP address in its DNS cache, the firewall may essentially be allowing access out to the unknown or malicious destination. Thus, the TTL helps to protect the client device from using an IP address that is too old to be trustworthy to send the client device to an intended destination. The TTL may be set to remove a record after the set time (e.g., five minutes) relative to a request being sent from the client device to access a domain and a response sent to the client device.

In the above examples where the firewall employs TTLs, the IP addresses the client seeks to access may be specific to each level of an FQDN. An FQDN includes a list of domain labels representing the hierarchy from the lowest relevant level in the DNS to the top-level domain (TLD). The domain labels are concatenated using the full stop "." character (dot or period) as a separator between labels. The DNS root is unnamed and is expressed as the empty label terminated by the dot such as in, for example, DNS zone files in which a fully qualified domain name must be specified with a trailing dot. For example, "somehost.example.com." explicitly specifies an absolute domain name that ends with the empty top level domain label. A device with the hostname "myhost" in the parent domain "example.com" has the fully qualified domain name "myhost.example.com.". The FQDN uniquely distinguishes the device from any other hosts called myhost in other domains. In this manner, "example.com" may map to a set of IP addresses, whereas "www.example.com" may map to a second set of IP addresses. "Mail.example.com" may map to yet another set of IP addresses. Thus, the administrator, in order to bring these additional FQDNs into the access policy may have to explicitly enter every possible permutation or subdomain associated with the IP address of example.com in order to have all subdomains of the domain brought into the access policy.

The above-identified examples and scenarios create uncertainty that leads to firewall access policies being either too lenient or too restrictive, and as a result, client devices may be incorrectly prevented from accessing a destination, or the network may be made vulnerable by having an undesirably broad set of IP address(es) included within the access policy.

Overview

In the examples described herein, a firewall device within a DNS server may allow access policies to be created based on domain names via the use of a DNS resolver. A linkage between a firewall device and a DNS resolver is created so that domain names may be used accurately and safely in the construction of access policies. This is done in a scalable and efficient manner. Further, the systems and methods described herein are completely transparent to all devices except the DNS resolver and the firewall device and services, so that it is backwards compatible and requires no changes on customer devices or networks.

Examples described herein provide a domain name system (DNS) resolver includes a processor and a non-transitory computer-readable media storing instructions that, when executed by the processor, causes the processor to perform operations including receiving, from a client device, a request for an internet protocol (IP) address associated with a domain name, determining the IP address associated with the domain name, sending data defining the IP address associated with the domain name to the client device, and sending a copy of the data defining the IP address associated with the domain name to a firewall device, the copy of the data including an identification of the client device. Although the data sent to the firewall device is referred to as a "copy" herein, the data sent from the DNS resolver to the firewall device may include separately generated data and may include additional data beyond that data sent to the client device including, for example, an identification of the client device.

The copy of the data defining the IP address associated with the domain name is sent to the firewall device based at least in part on the receiving, from the client device, the request for the IP address associated with the domain name. Sending the copy of the data further includes sending at least one additional IP address associated with the domain name, the additional IP address being associated with a subdomain under the domain name. The domain name may be a fully qualified domain name (FQDN).

The operations further include receiving, from the client device, a notification of an association between the client device and the firewall device. The sending of the copy of the data to the firewall device is performed based at least in part on an identification by the client device of the firewall device in the notification. The DNS resolver and firewall device may be executed within a cloud computing-based network infrastructure.

Examples described herein also provide a domain name system (DNS) server. The DNS server includes a DNS resolver, a firewall device communicatively coupled to the DNS resolver, a processor, and a non-transitory computer-readable media storing instructions. The instructions, when executed by the processor, causes the processor to perform operations including, with the DNS resolver, receive, at the DNS resolver, an access policy associated with the firewall device based at least in part on a creation of the access policy at the firewall device, receive, from a client device, a request for an internet protocol (IP) address associated with a domain name, determine the IP address associated with the domain name, send data defining the IP address associated with the domain name to the client device, and send a copy of the data defining the IP address associated with the domain name to the firewall device, the copy of the data including an identification of the client device. The operations further include, with the firewall device, generate a domain name registry (DNR) entry of the copy of the data defining the IP address associated with the domain name including the identification of the client device, receive a data packet from the client device addressed to the IP address based at least in part on the sending of the data defining the IP address associated with the domain name to the client device, inspect the data packet for the IP address, and determine that the IP address matches the domain name within the DNR entry. Again, although the data sent to the firewall device is referred to as a "copy" herein, the data sent from the DNS resolver to the firewall device may include separately generated data and may include additional data beyond that data sent to the client device including, for example, an identification of the client device.

The operations further include restricting the data packet from transmission to the IP address based at least in part on the IP address matching the domain name within the DNR entry. The sending of the copy of the data defining the IP address associated with the domain name is sent to the firewall device based at least in part on the receiving, from the client device, the request for the IP address associated with the domain name. Sending the copy of the data further includes sending at least one additional IP address associated with the domain name, the additional IP address being associated with a subdomain under the domain name. The domain name may be a fully qualified domain name (FQDN).

The operations further include, with the DNS resolver, receiving, from the client device, a notification of an association between the client device and the firewall device. The sending of the copy of the data to the firewall device may be performed based at least in part on an identification by the client device of the firewall device in the notification. The DNS server including the DNS resolver and the firewall device includes a cloud computing-based network infrastructure.

Examples described herein also provide a non-transitory computer-readable medium storing instructions that, when executed, causes a processor to perform operations, including, with a firewall device communicatively coupled to a DNS resolver, generating a domain name registry (DNR) entry of a copy of data defining an internet protocol (IP) address associated with a domain name based at least in part on a DNS query request from a client device, the copy of the data defining the internet protocol (IP) address associated with the domain name being sent from the DNS resolver.

The operations further include receiving a data packet from the client device addressed to the IP address, inspecting the data packet for the IP address, and determining that the IP address matches the domain name within the DNR entry.

The operations further include receiving an access policy, the access policy identifying the domain name, and sending the access policy to the DNS resolver. The access policy may be at least one of a layer-3 access policy and a layer-4 access policy. The operations further include restricting the data packet from transmission to the IP address based at least in part on the IP address matching the domain name within the DNR entry. Receiving the data packet from the client device may be based at least in part on the DNS resolver sending the data defining the IP address associated with the domain name to the client device.

The domain name may be a fully qualified domain name (FQDN), and the copy of the data may further include at least one additional IP address associated with the domain name, the additional IP address being associated with a subdomain under the domain name. The DNS resolver and firewall device may be executed within a cloud computing-based network infrastructure. Again, although the data sent to the firewall device is referred to as a "copy" herein, the data sent from the DNS resolver to the firewall device may include separately generated data and may include additional data beyond that data sent to the client device including, for example, an identification of the client device.

As used in the present specification and in the appended claims, the term "domain name" is meant to be understood broadly as any identification string that defines a realm of administrative autonomy, authority, or control within a network including the Internet, and is formed via access policies and procedures of the domain name system (DNS). Further, a domain name identifies a network domain and represents an internet protocol (IP) resource, such as a personal computer used to access a network including the Internet, a server computer hosting a web site, or the web site itself, or any other service communicated via the Internet. a domain name may include a fully qualified domain name (FQDN).

As used in the present specification and in the appended claims, the term "access policy" is meant to be understood broadly as any rule used to define whether a data packet sent from a client device may be sent on to a destination. The access policies may be defined by an administrator and provided to a firewall device for execution. In one example, the access policies are layer-3/layer-4 (network layer/transport layer) firewall rules.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram 100 of a domain name system (DNS) server 102 and associated firewall traffic call flows, according to an example of the principles described herein. A number of client device(s) 104 may be communicatively coupled to a DNS server 102 in order to utilize the services provided by the DNS server 102 including the DNS resolver 110 and the firewall device 112. The client devices 104 may include any endpoint device seeking to access resources and/or services provided in another network such as the Internet 106. In one example, the client devices 104 may include a workstation, a desktop computer, a laptop, a tablet, a network appliance, an e-reader, a smartphone, a server, a switch, a router, a hub, a bridge, a gateway, a modem, a repeater, an access point, or other computing devices. In one example, the firewall device 112 and the DNS resolver 110 may be implemented by the same hardware, software, and/or firmware devices and packages. Further, in one example, the firewall device 112 and the DNS resolver 110 may be implemented in the same DNS server. Still further, in one example, the firewall device 112 and the DNS resolver 110 may be implemented in two separate DNS servers 102 and/or by two separate firewall service vendors or integrated vendors. In one example, the DNS resolver 110 and the firewall device 112 are communicatively coupled to one another via a control plane connection. The firewall device 112 has a control plane connection to the DNS resolver 110. Further, in one example, the firewall device 112 and the DNS resolver 110 may communicate with one another using any protocol such as, for example, user datagram protocol (UDP).

In one example, the firewall device 112 may be a host-based firewall deployed directly on the client device 104. In this example, the firewall device 112 may include a daemon or service as a part of the operating system or an agent application for protection. In this manner, the firewall device 112 may control network traffic or other computing resources.

In one example, the DNS resolver 110 may implement techniques to identify client devices 104 beyond their public/egress IP address. This identifying information may be passed to the firewall device 112, where the firewall device 112 updates the access policy to narrowly control which client device 104 is expected to connect to which destination IP address(es). Extension mechanisms for DNS (EDNS) is a specification for expanding the size of several parameters of the Domain Name System (DNS) protocol which has size restrictions that Internet engineering groups have deemed too limited for increasing functionality of the protocol. EDNS adds information to DNS messages in the form of pseudo-Resource Records ("pseudo-RR"s) included in the additional data section of a DNS message. In one example, the additional data section may exist in both requests and responses. Thus, information may be encoded in EDNS in a DNS query sent to the DNS resolver 110.

A client device 104, in the examples described herein, may be seeking to access the resources and/or services provided by, for example, the Internet 106, and may seek specific resources and/or services located at a domain within the Internet 106 and identifiable by a domain name and a corresponding IP address. For example, a user of the client device 104 may wish to access the domain name "www.example.com" that has the IP address for 2606:2800:220:1:248:1893:25c8:1946. However, an administrator of the client device 104 may wish to restrict the user's access to the www.example.com for any number of reasons including www.example.com including untrusted, unverified, malicious, deceitful, or otherwise undesirable content, data, executable code, resources, and/or services. Thus, the DNS server 102 and its DNS resolver 110 and firewall device 112 are used to ensure that administrator-created access policies are received from the administrator and enforced as to traffic from the client device 104 to the Internet 106. Enforcement of an access policy may include restricting or allowing access to the domain identified by the domain name/IP address in a request from the client device 104.

The DNS server 102 may be any sever computing device or server component of a domain name system (DNS). A DNS is any combination of hardware, software, and firmware that functions to maintain a domain namespace and provides translation services between the domain namespace and the IP address system. The DNS server 102 may be any server that stores a number of DNS records, and name server (NS) records, among other data for a domain name, and responds with answers to queries against its database. The queries include DNS access requests that include requests to access resources and/or services provided at IP address 2606:2800:220:1:248:1893:25c8:1946 corresponding to www.example.com. A request for the domain name (DN and/or FQDN) that corresponds to the IP address(es) within the DNS query request.

The DNS server 102 may include, in one example, a virtual private network (VPN) concentrator as intermediate hardware, software, and/or firmware positioned between the client device 104 and the DNS server. A VPN concentrator is a type of networking device that provides secure creation of VPN connections and delivery of messages between VPN nodes such as the client device 104 and the DNS server 102. In one example, the VPN concentrator may include a router device, built to creating and manage a VPN communication infrastructure. Thus at 1 of FIG. 1, the client device 104 may communicate with the DNS server 102 via VPN connection using, for example, an encrypted layered tunneling protocol to create a VPN tunnel to the DNS server 102. In one example, the client device 104 may be required to provide various authentication processes to create the VPN connection with the DNS server 102. In one example, authentication may be provided via at least one IP security (IPSec) protocol developed by the Internet Engineering Task Force (IETF) that defines communications between two devices across an IP network and provides data authentication, integrity, and confidentiality, and defines encrypted, decrypted, and authenticated packets.

In one example, the functionality and services of the DNS server may be provided as a cloud computing-based network infrastructure and service. In this example, the DNS server 102 may be offered as on-demand computer system resources such as data storage, DNS services, and/or computing power, without direct active management by the user of the client device 104 and/or the administrator. In one example, the cloud-based DNS server 102 may include a private or enterprise cloud provided to an organization such as the administrator's organization, and/or may include a public cloud. In one example, the functionality and services of the DNS server may be provided by the Umbrella® cloud computing security product suite developed and offered by Cisco Systems, Inc. to provide DNS resolution services, phishing protection services, content filtering services, DNS resolution processing services, DNS-layer security services, secure web gateway services, firewall services, cloud access security broker (CASB) services, and interactive threat intelligence (ITI) services, among other services. Further, the functionality described herein may occur as an on-demand availability of computer system resources (e.g., infrastructure as a service (IaaS), hardware as a service (HaaS), Internet of Things as a Service (IoTaaS), load balancing as a service (LBaaS), network as a service (NaaS), function as a service (FaaS), software as a service (SaaS), anything as a service (XaaS), among others) including data storage (cloud storage) and computing power, without direct active management by the user.

In one example, all traffic from the client device 104 is sent to the firewall device 112. The traffic includes at least one data packet that includes an IP address to which the data packet is to be sent. The firewall device 112 may be any network security system that monitors and controls incoming and outgoing network traffic based on a number of access policies created by an administrator of the DNS server 102 and/or the client device 104. In the examples described herein, the firewall device 112 functions to allow access policies to be created based on domain names via the use of a DNS resolver. A linkage between the firewall device 112 and the DNS resolver 110 is created so that domain names may be used accurately and safely in the construction of access policies. Thus, at 2 of FIG. 1, the traffic is sent to the firewall device 112.

The administrator may create or define a number of domain name-based access policies (e.g., firewall rules) that define whether the client device 104 may access resources and/or services provided by a server located within the Internet 106. In one example, the domain name-based rules may be fully qualified domain name (FQDN)-based access policies to allow for any number of subdomains within a domain's tree hierarchy to be subjected to the access policies including the top-level domain (TLD) and the root zone of the domain. Thus, at 3 of FIG. 1, these administrator-created access policies may be transmitted to the firewall device 112 for storage and execution in response to receiving traffic from the client device 104. Further, at 3 of FIG. 1, the administrator-created access policies may be transmitted to the DNS resolver 110.

At 4 of FIG. 1, the domain name identified by the client device 104 in a DNS query to the DNS resolver 110 may be the subject matter of a DNS resolution process performed by the DNS resolver 110. In one example, a DNS resolution process performed by the DNS resolver 110 includes any query technique of the DNS resolver 110 of the DNS server 102 to determine and number of IP address(es) for the domain name identified in the DNS query from the client device 104. The result of the DNS resolution process performed by the DNS resolver 110 includes the IP address(es) corresponding to the domain name, data about an IP address's autonomous system number (ASN) such as the IP owner, a registration date, an issuing registrar, a max range of the autonomous system (AS) with total IPs, a location of the IP address, a namespace, and a number of sub-domains associated with the domain name. Also, at 4 of FIG. 1, the DNS resolver 110 sends this information to the firewall device 112.

At 5 of FIG. 1, the firewall device 112 determines whether the network traffic from the client device 104 is to be passed onto the Internet 106 or not based at least on the access policies the administrator defined at the firewall device 112 that includes the domain name identified by the DNS resolver 110 in the data packet. Thus, the firewall device 112 may learn the relationship between a domain name (e.g., including an FQDN) and an IP address(es) on a very specific basis without performing a deep packet inspection of the data packet sent from the client device 104 and without having to snoop the DNS traffic traversing the firewall device 112. In examples where the access policies defined at the firewall device 112 determine that the domain name is allowed to be accessed by the client device 104, the data packet may be sent onto the domain defined by the domain name (and corresponding IP address(es)) within, for example, the Internet 106. In one example, the data packet may be sent by the firewall device 112 to a network address translation (NAT) device 114 to map or remap an IP address space into another by modifying network address information in the IP header of the data packet while the data packet is in transit from the DNS server 102 to the domain within the Internet 106. The NAT device 114 may be any traffic routing device.

Figure 2:
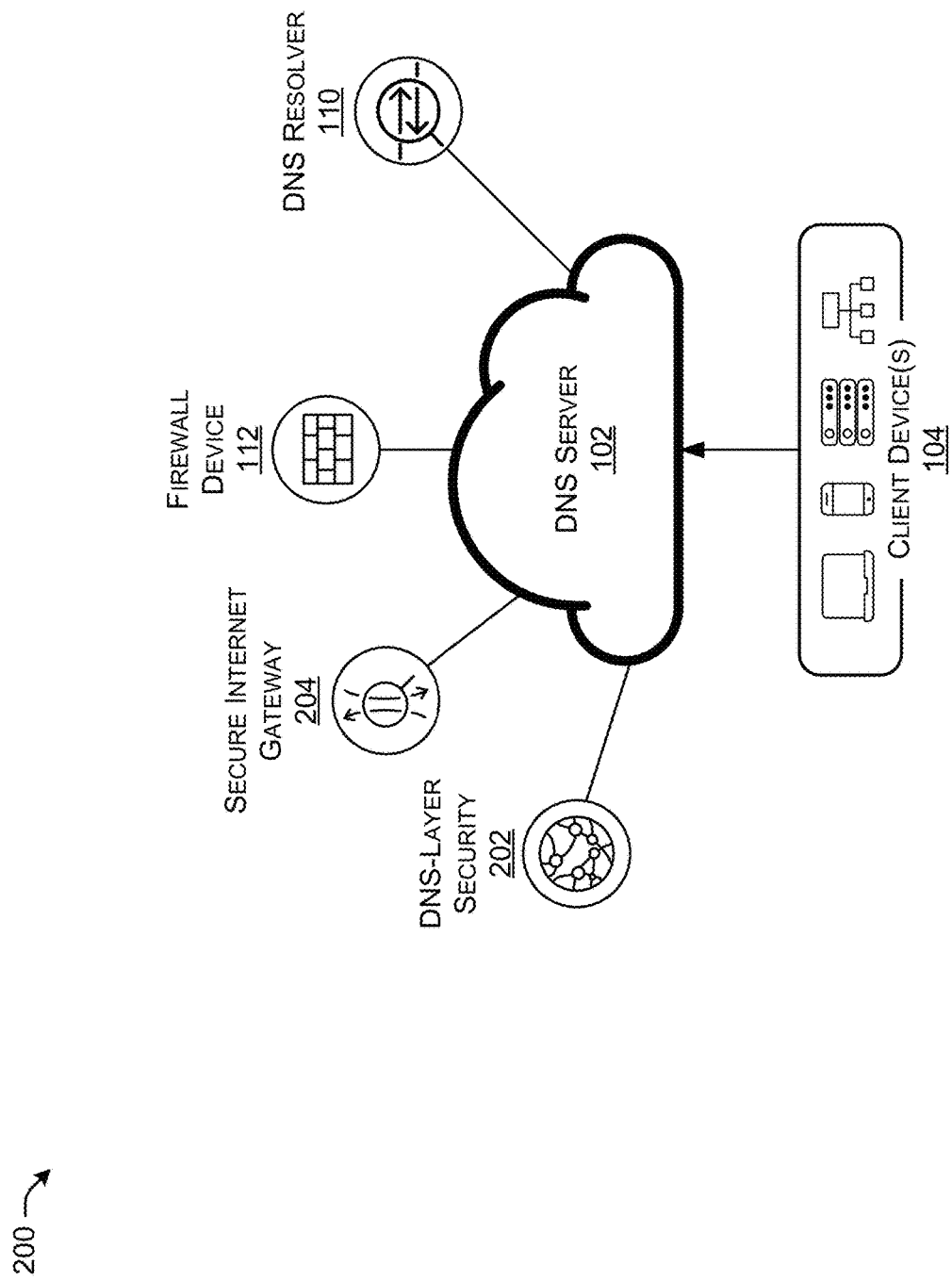
FIG. 2 illustrates a system-architecture diagram of a cloud computing-based network infrastructure of a DNS server, according to an example of the principles described herein.

FIG. 2 illustrates a system-architecture diagram 200 of a cloud computing-based network infrastructure of a DNS server 102, according to an example of the principles described herein. As depicted in FIG. 2, the DNS resolver 110 and the firewall device 112 may be included in a cloud computing-based network infrastructure. The cloud computing-based network infrastructure of the DNS server 102 may include additional resource and/or services such as a DNS-layer security service 202 and a secure internet gateway service 204. Further, the cloud computing-based network infrastructure of a DNS server 102 may provide DNS resolution services, phishing protection services, content filtering services, DNS-layer security services, secure web gateway services, firewall services, cloud access security broker (CASB) services, and interactive threat intelligence (ITI) services, among other services. Further, the cloud computing-based network infrastructure of a DNS server 102 may provide on-demand availability of computer system resources (e.g., infrastructure as a service (IaaS), hardware as a service (HaaS), Internet of Things as a service (IoTaaS), load balancing as a service (LBaaS), network as a service (NaaS), function as a service (FaaS), software as a service (SaaS), anything as a service (XaaS), among others) including data storage (cloud storage) and computing power, without direct active management by the user. In one example, the functionality and services of the DNS server 102 may be provided by the Umbrella® cloud computing security product suite developed and offered by Cisco Systems, Inc.

Figure 3:
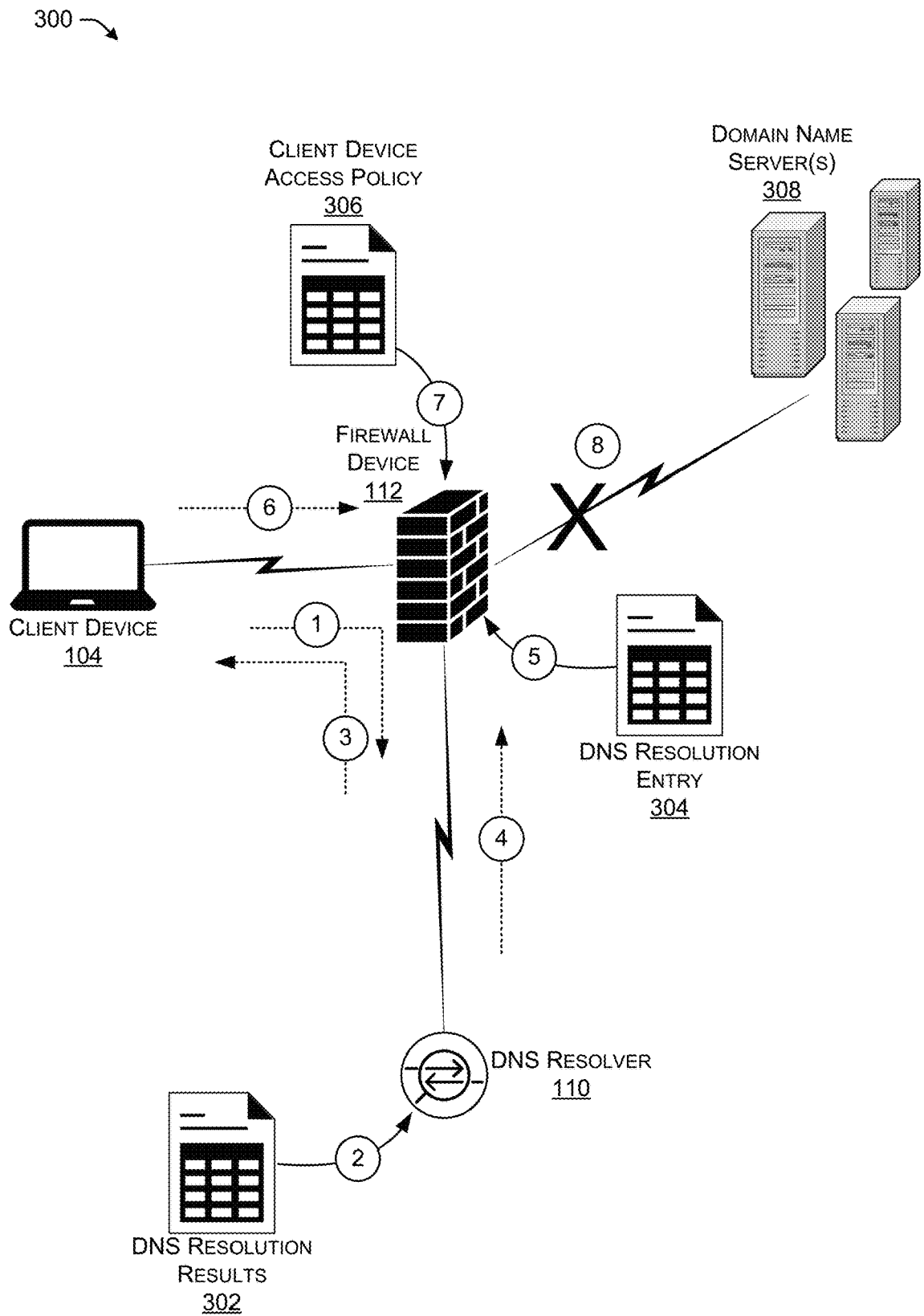
FIG. 3 illustrates a call flow diagram between a client device and a DNS server, according to an example of the principles described herein.

FIG. 3 illustrates a call flow diagram 300 between a client device 104 and a DNS server 102, according to an example of the principles described herein. At 1 of FIG. 3, the client device 104 may submit a DNS query to determine the IP address(es) (e.g., "2606:2800:220:1:248:1893:25c8:1946") for a domain name or FQDN (e.g., "www.example.com") the client device 104 indicates it has or will include in a data packet sent from the client device 104 to the domain name server(s) 308 included as part of the Internet 106. The DNS query may be sent to the DNS resolver 110 (i.e., a service of the DNS server 102 that resolves a domain name and/or a FQDN to an IP address(es)) via the firewall device 112 or directly from the client device 104. In the examples described herein, the DNS resolver 110 is given full access to information from the client device 104 because the DNS resolver and the DNS server 102 are first party entities with respect to the information from the client device 104. Further, in one example, the DNS queries sent from the client device to the DNS resolver 110 may not be transmitted via the firewall device 112, but may be directly sent to the DNS resolver 110. In this example, a direct communication channel may exist between the client device 104 and the DNS resolver 110. The client device 104 and the DNS resolver 110 may communicate with one another using any protocol such as, for example, user datagram protocol (UDP).

The DNS resolver 110, at 2 of FIG. 3, is queried for the IP address(es) that correspond to the domain name (DN and/or FQDN) included within the DNS query. In one example, the DNS resolver 110 of the DNS server 102 may determine the IP address(es) that correspond to the domain name using a lookup table stored in a DNS cache of the DNS resolver 110 by looking up a domain name string value representing the domain name in the DNS cache.

In one example, however, the DNS resolver 110 may make a query to the DNS root nameserver located in the Internet 106 including the servers numbered among the domain name servers 308. In this example, the DNS root nameserver included among the domain name servers 308 responds to the DNS resolver 110 with the address of TLD DNS server (e.g., .com or .net) also included among the domain name servers 308 which stores the information for its domains. The DNS resolver 110 may then make a request to the .com TLD, for example. The TLD server included among the domain name servers 308 may then respond to the DNS resolver 110 with the IP address of the domain's nameserver, example.com. The DNS resolver 110 may then send a query to the domain's nameserver included among the domain name servers 308. The IP address for example.com is then returned to the DNS resolver 110 from the nameserver. The DNS resolver 110 may then store the data received from the domain name servers 308 in its DNS cache and/or send the data to the client device 104 and/or the firewall device 112 including the IP address of the domain requested by the client device 104 initially.

Figure 4:
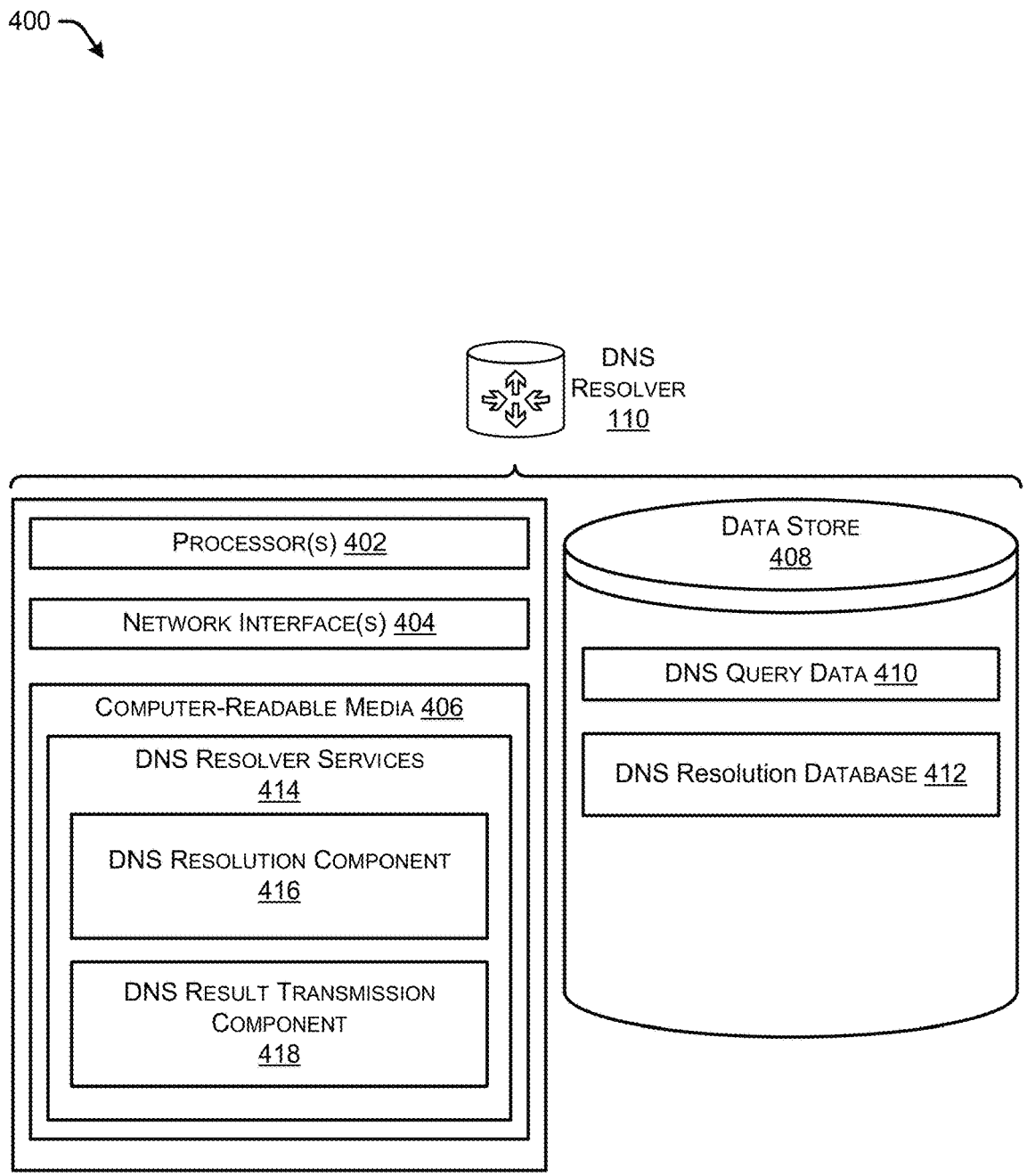
FIG. 4 is a component diagram of example components of a DNS resolver, according to an example of the principles described herein.

Turning again to FIG. 3, the DNS resolver 110 may store the data related to the DNS resolution in a DNS resolution database (e.g., a DNS cache) such as the DNS resolution database 412 depicted in FIG. 4. In one example, data defining the DNS resolution results 302 may be stored within the DNS resolution database as a lookup table, a data matrix, or other array data structure to save on processing time and computing resources.

At 3 of FIG. 3, the DNS resolver 110 returns the IP address resolved based on the domain name presented to the DNS resolver 110 in the DNS query from the client device 104. The client device 104 may use the resolved IP address in its communications with the domain name servers 308 located within a part of the Internet 106 via the firewall device 112. Further, in one example, the DNS resolver 110 may provide the client device 104 a time to live (TTL) value. The TTL value may be applied to the data or records within a DNS cache to define the lifespan or lifetime of the data or records. The TTL value prevents the access policy from becoming too broad (e.g., too lenient). For example, the IP address the client device is using to access a destination via a web service may change within or after the five-minute TTL value. In this case, the IP address may actually direct the client device 104 to an unknown and possibly malicious destination. If the firewall device 112 still has that IP address in its DNS cache (e.g. as a DNS resolution entry 304), the firewall device 104 may essentially be allowing access out to the unknown or malicious destination. Thus, the TTL helps to protect the client device 104 from using an IP address that is too old to be trustworthy to send the client device 104 to an intended destination. The TTL may be set to remove a record (e.g. as a DNS resolution entry 304) after the set time (e.g., five minutes) relative to a request being sent from the client device 104 to access a domain and a response sent to the client device 104. In the above examples where the firewall device 112 employs TTLs, the IP addresses the client device 104 seeks to access may be specific to each level of an FQDN.

In addition to sending the IP address to the client device 104, data associated with the DNS resolution performed by the DNS resolver 110 is copied to the firewall device 112. Thus, at 4 of FIG. 3, the DNS resolver 110 generates and sends a resolution data packet to the firewall device 112. The resolution data packet sent by the DNS resolver 110 identifies the client device 104 that requested the resolution of the domain name sent by the client device 104. By including the identification of the client device within the resolution data packet sent by the DNS resolver 110 ensures that the firewall device 112 may apply access polices related to the IP address (e.g., 2606:2800:220:1:248:1893:25c8:1946) and the domain name (e.g., www.example.com) as the client device 104 sends data packets within network traffic to the domain name servers 308 via the firewall device 112. In this manner, the firewall device 112 may apply access policies as defined by an administrator to communications sent by the client device 104.

In examples where a client device 104 attempts to use a DNS resolver 110 that is not part of the system, the firewall device 112 may perform destination network address translation (DNAT) to redirect the DNS traffic to the desired DNS resolver 110, or the firewall device 112 may block all DNS traffic that is not destined for the desired DNS resolver 110.

Further, the resolution data packet sent by the DNS resolver 110 to the firewall device 112 identifies the domain name (e.g., DN and/or FQDN) such as "www.example.com," and the resolved IP address for that domain name. The correlation of the domain name and IP address provided by the DNS resolver 110 assists the firewall device 112 in determining the application of the access policies associated with the IP address contained in data packets sent from the client device 104. Specifically, in determining whether to forward network traffic from the client device 104 to the domain name servers 308 of the Internet, the firewall device 112 determines that the destination IP address (e.g., 2606:2800:220:1:248:1893:25c8:1946) of the network traffic from the client device 104 matches the domain name (DN and/or FQDN) (e.g., www.example.com) that is defined in the access policy including entries within, for example, a blacklist or whitelist defined for the client device 104 within the access policies. Further, in one example, the DNS resolver 110 may also include in the resolution data packet sent to the firewall device 112 a TTL value.

Further, in one example, the DNS resolver 110 may also include in the resolution data packet sent to the firewall device 112 other related data and information such as the IP addresses of other domain names (e.g., DNs and/or FQDNs) under the associated domain name "example.com." In this manner, the parent zone or "wildcard" scenario may be managed by the administrator indicating in the access policy that the access restrictions defined by the access policy are to apply to the entire zone by adding, for example, a leading "." character or "*." characters to the domain name. In a scenario where these wildcard notations are indicated, the DNS resolver 110 may configure itself to send the information about observed DNS resolutions for the entire zone (e.g., domain) to the firewall device 112 instead of just for a FQDN. In this manner, the firewall device 112 may accept and execute access policies defined by the administrator that include wildcard notations (e.g., wildcard access policies).

In one example, the DNS server 102 may preconfigured with access policies or flags to instruct the DNS resolver 110 to send the resolution data packet to at least one firewall device 112. Further, in the examples described herein, complete information may be received by the firewall device 112 from the DNS resolver 110 with no encryption or decryption processes needed, and no snooping processes needed because the DNS server 102 (e.g., the DNS resolver 110) handles the DNS query requests from the client device(s) 104 directly.

Figure 5:
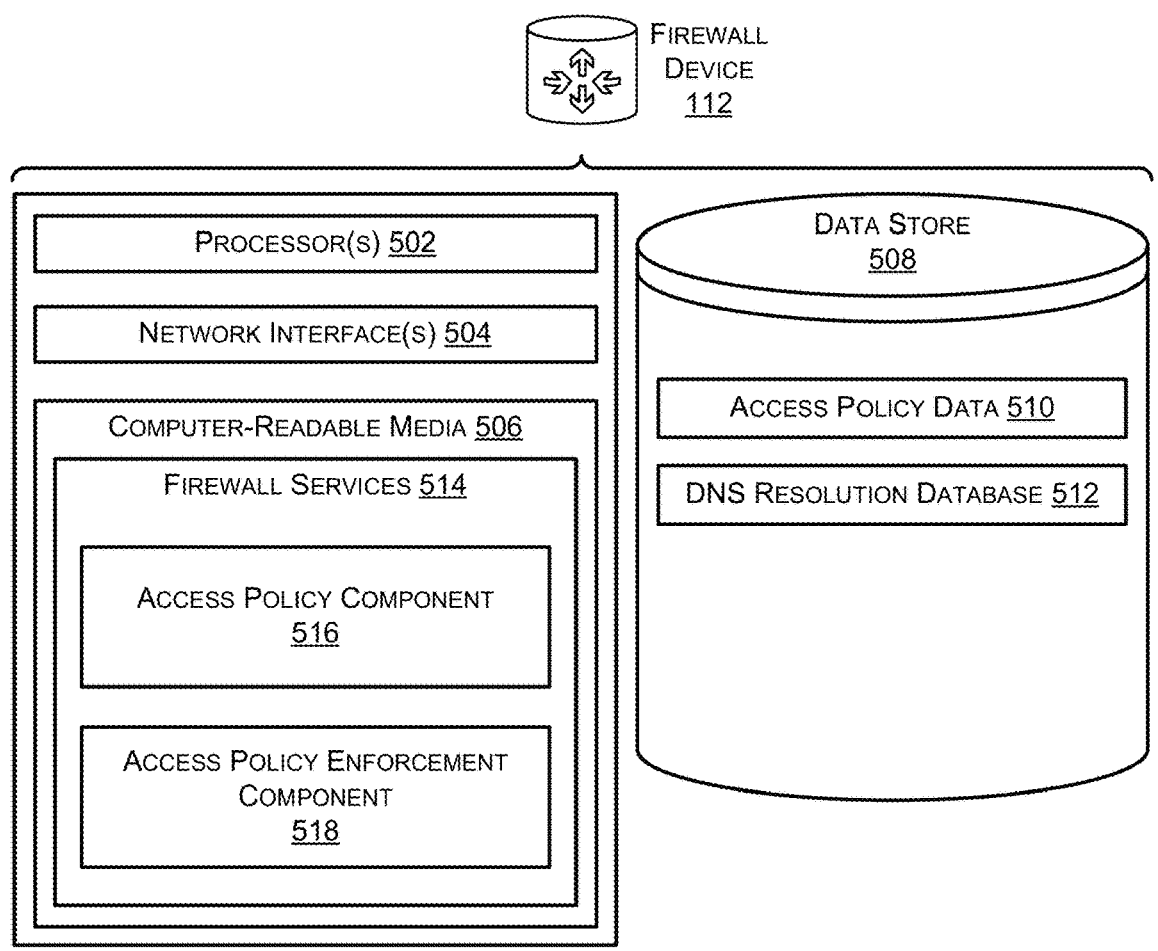
FIG. 5 is a component diagram of example components of a firewall device, according to an example of the principles described herein.

At 5 of FIG. 3, the firewall device 112 generates a DNS resolution entry 304 for the resolution data packet sent from the DNS resolver 110. The DNS resolution entry 304 may be stored as, for example, DNS resolution data within the DNS resolution database 512 in a data store 508 of the firewall device 112 as depicted in FIG. 5. The firewall device 112 may access the DNS resolution data within the DNS resolution database 512 when applying the access policies to network traffic sent by the client device 104 as described herein.

At 6 of FIG. 3, the client device 104, having received the IP address resolved based on the domain name presented to the DNS resolver 110 in the DNS query, may send data packets as network traffic to the domain name serves 308 within the Internet 106. Specifically, the client device 104 sends the data packet addressed to the IP address resolved by the DNS resolver 110 and identified by the firewall device 112 during access policy enforcement.

In doing so, the client device 104 sends the data packet to the firewall device 112. The firewall device 112, at 7 of FIG. 3, examines the data packet and the destination IP address appended to the data packet. The firewall may utilize access policy data 510 of FIG. 5 to identify a client device access policy 306 that is used by the firewall device 112 to allow or block the data packet based on the access policy. By correlating the DNS resolution entry 304 and the client device access policy 306 for the client device 104, the firewall device 112 may determine that the destination IP address (e.g., 2606:2800:220:1:248:1893:25c8:1946) included in the data packet from the client device 104 matches is the domain name (DN and/or FQDN) that is included in the client device access policy 306. If a match is found, the firewall device 112, at 8 of FIG. 3, may allow or block transfer of the data packet to the domain name servers 308 included as part of the Internet 106 based on the client device access policy 306.

FIG. 4 is a component diagram 400 of example components of a DNS resolver 110, according to an example of the principles described herein. As illustrated, the DNS resolver 110 may include one or more hardware processor(s) 402 configured to execute one or more stored instructions. The processor(s) 402 may comprise one or more cores. Further, the DNS resolver 110 may include one or more network interfaces 404 configured to provide communications between the DNS resolver 110 and other devices, such as devices associated with the DNS server 102 including the client device(s) 104, the domain name servers 308 included within the Internet 106, the VPN concentrator 108, the firewall device 112, the NAT device 114, the DNS-layer security service 202, the secure internet gateway service 204, and/or other systems or devices associated with the DNS resolver 110 and/or remote from the DNS resolver 110. The network interfaces 404 may include devices configured to couple to personal area networks (PANs), wired and wireless local area networks (LANs), wired and wireless wide area networks (WANs), and so forth. For example, the network interfaces 404 may include devices compatible with the client device(s) 104, the domain name servers 308 included within the Internet 106, the VPN concentrator 108, the firewall device 112, the NAT device 114, the DNS-layer security service 202, the secure internet gateway service 204, a cloud computing-based network infrastructure.

The DNS resolver 110 may also include computer-readable media 406 that stores various executable components (e.g., software-based components, firmware-based components, etc.). In addition to various components discussed herein, the computer-readable media 406 may further store components to implement functionality described herein. While not illustrated, the computer-readable media 406 may store one or more operating systems utilized to control the operation of the one or more devices that comprise the DNS resolver 110. According to one example, the operating system comprises the LINUX operating system. According to another example, the operating system(s) comprise the WINDOWS SERVER operating system from MICROSOFT Corporation of Redmond, Washington According to further examples, the operating system(s) may comprise the UNIX operating system or one of its variants. It may be appreciated that other operating systems may also be utilized.

Additionally, the DNS resolver 110 may include a data store 408 which may comprise one, or multiple, repositories or other storage locations for persistently storing and managing collections of data such as databases, simple files, binary, and/or any other data. The data store 408 may include one or more storage locations that may be managed by one or more database management systems. The data store 408 may store, for example, DNS query data 410 defining DNS queries sent from the client device(s) 104 and the domain names (DNs and/or FQDNs) included within the DNS queries. These DNS queries may be stored for processing purposes, as well as to retain a history of DNS queries sent from the client device 104 to the DNS resolver 110, and to allow the DNS resolver 110 to send data related to the DNS queries to other computing devices including, for example, the firewall device 112.

Further, the data store 408 may store a DNS resolution database 412. The DNS resolution database 412 may include any data obtained by the DNS resolver 110 regarding the resolution of the domain name contained within DNS queries from the client device 104. This data may include, for example, data defining an identity of the client device 104 that requested the resolution of the domain name sent by the client device 104, data defining the domain name (e.g., DN and/or FQDN) such as "www.example.com," and the resolved IP address for that domain name, the IP addresses of other domain names (e.g., DNs and/or FQDNs) under the associated domain name "example.com," and other data described herein that may assist the firewall device 112 in executing access policies.

The computer-readable media 406 may store portions, or components, of a DNS resolution service 414. For instance, the DNS resolution service 414 of the computer-readable media 406 may include a DNS resolution component 416 to, when executed by the processor(s) 402, perform a DNS resolution process where the DNS resolver 110 determines an IP address(es) that correlate with the domain name included in the DNS query from the client device 104.

The DNS resolution service 414 may also include a DNS result transmission component 418 to, when executed by the processor(s) 402, transmit the results of a DNS resolution process performed by the DNS resolver 110 to other computing devices according to the techniques described herein. For example, the DNS result transmission component 418 may send the data defining the DNS resolution results 302 or portions thereof to the client device 104 and the firewall device 112. The DNS result transmission component 418 may cause the DNS resolver 110 to send, to the client device 104, the resolved IP address of the domain name included in the DNS query received from the client device 104. Further, the DNS result transmission component 418 may cause the DNS resolver 110 to send, to the firewall device 112 the resolution data packet as described herein in connection with element 4 of FIG. 3 and as described herein.

FIG. 5 is a component diagram 500 of example components of a firewall device 112, according to an example of the principles described herein. As illustrated, the firewall device 112 may include one or more hardware processor(s) 502 configured to execute one or more stored instructions. The processor(s) 502 may comprise one or more cores. Further, the firewall device 112 may include one or more network interfaces 504 configured to provide communications between the firewall device 112 and other devices, such as devices associated with the DNS server 102 including the client device(s) 104, the domain name servers 308 included within the Internet 106, the VPN concentrator 108, the DNS resolver 110, the NAT device 114, the DNS-layer security service 202, the secure internet gateway service 204, and/or other systems or devices associated with the firewall device 112 and/or remote from the firewall device 112. The network interfaces 504 may include devices configured to couple to personal area networks (PANs), wired and wireless local area networks (LANs), wired and wireless wide area networks (WANs), and so forth. For example, the network interfaces 504 may include devices compatible with the client device(s) 104, the domain name servers 308 included within the Internet 106, the VPN concentrator 108, the DNS resolver 110, the NAT device 114, the DNS-layer security service 202, the secure internet gateway service 204, a cloud computing-based network infrastructure.

The firewall device 112 may also include computer-readable media 506 that stores various executable components (e.g., software-based components, firmware-based components, etc.). In addition to various components discussed herein, the computer-readable media 506 may further store components to implement functionality described herein. While not illustrated, the computer-readable media 506 may store one or more operating systems utilized to control the operation of the one or more devices that comprise the firewall device 112. According to one example, the operating system comprises the LINUX operating system. According to another example, the operating system(s) comprise the WINDOWS SERVER operating system from MICROSOFT Corporation of Redmond, Washington According to further examples, the operating system(s) may comprise the UNIX operating system or one of its variants. It may be appreciated that other operating systems may also be utilized.

Additionally, the firewall device 112 may include a data store 508 which may comprise one, or multiple, repositories or other storage locations for persistently storing and managing collections of data such as databases, simple files, binary, and/or any other data. The data store 508 may include one or more storage locations that may be managed by one or more database management systems. The data store 508 may store, for example, access policy data 510 defining access policies to be executed during operation of the firewall device 112. These access policies may be created by an administrator of the DNS server 110, DNS resolver 110, and/or the firewall device 112 to ensure that the client device 104 is not and does not access untrusted, unverified, malicious, deceitful, or otherwise undesirable resources found on the Internet 106. The access policies such as the client device access policy 306 defined by the administrator for the client device 104 may be stored for processing purposes, as well as to retain a history of access policies sent from the administrator to the firewall device 112, and to allow the firewall device 112 to execute the access policies in order to allow or block data packets sent by the client device 104 based on the access policy.

Further, the data store 508 may store a DNS resolution database 512. The DNS resolution database 512, like the DNS resolution database 412 of the DNS resolver 110 of FIG. 4, may include any data obtained by the firewall device 112 from the DNS resolver 110 regarding the resolution of the domain name contained within DNS queries from the client device 104. This data may include, for example, data defining an identity of the client device 104 that requested the resolution of the domain name sent by the client device 104, data defining the domain name (e.g., DN and/or FQDN) such as "www.example.com," and the resolved IP address for that domain name, the IP addresses of other domain names (e.g., DNs and/or FQDNs) under the associated domain name "example.com," and other data described herein that may assist the firewall device 112 in executing access policies for the client device 104 and other client devices specifically.

The computer-readable media 506 may store portions, or components, of a firewall service 514. For instance, the firewall service 514 of the computer-readable media 506 may include an access policy component 516 to, when executed by the processor(s) 502, receive and store the access policies created and sent from an administrator.

The firewall service 514 may also include a access policy enforcement component 518 to, when executed by the processor(s) 502, allow or block transfer of the data packets from the client device 104 to the domain name servers 308 included as part of the Internet 106 based on the client device access policy 306. For example, the access policy may identify a number of domain names (DN and/or FQDN) that are included in the client device access policy 306. Once the client device 104 sends data packets that include an IP address supplied by the DNS resolver 110 and included in the client device access policy 306, the firewall device 112 will allow or block transfer of the data packet to the domain name servers 308 included as part of the Internet 106 based on the client device access policy 306.

FIG. 6 illustrates a flow diagram of an example method 600 for performing a DNS resolver-assisted domain name-based access control within a firewall device 112, according to an example of the principles described herein. The systems and methods of operation associated with the DNS resolver 110 is described in connection with FIG. 6. The method 600 may, at 602, include receiving, from a client device 104, a request for an internet protocol (IP) address associated with a domain name (e.g., a DN and/or a FQDN). This DNS query may include a domain name (DN) and/or a fully qualified domain names (FQDN)).

At 604, the DNS resolver 110 determines the IP address associated with the domain name in the DNS query. As described above, the DNS resolver 110 may make a query to a DNS root nameserver located in the Internet 106 including the servers numbered among the domain name servers 308. In this example, the DNS root nameserver included among the domain name servers 308 responds to the DNS resolver 110 with the address of TLD DNS server (e.g., .com or .net) also included among the domain name servers 308 which stores the information for its domains. The DNS resolver 110 may then make a request to the .com TLD, for example. The TLD server included among the domain name servers 308 may then respond to the DNS resolver 110 with the IP address of the domain's nameserver, example.com. The DNS resolver 110 may then send a query to the domain's nameserver included among the domain name servers 308. The IP address for example.com is then returned to the DNS resolver 110 from the nameserver. The DNS resolver 110 may then store the data received from the domain name servers 308 in its DNS cache (e.g., the DNS resolution database 412).

The DNS resolver 110, at 606, may send data defining the IP address associated with the domain name to the client device 104. The client device 104 may use the IP address to prepare a data packet for sending to the domain name based on the IP address resolved by the DNS resolver 110. The client device 104 will send that data packet along with the IP address to the firewall device 112 in order to allow the firewall device 104 to allow or block the data packet based on an access policy created by an administrator related to the client device (e.g., client device access policy 306).

At 608, the DNS resolver 110 also sends a copy of the data defining the IP address associated with the domain name to the firewall device 112 as well. The copy of the data includes an identification of the client device 104 as well as the correlated IP address and domain name. Although the data sent to the firewall device is referred to as a "copy" herein, the data sent from the DNS resolver to the firewall device may include separately generated data and may include additional data beyond that data sent to the client device including, for example, an identification of the client device and other data described herein.

With this information, the client device access policy 306 may be created and applied by the firewall device 112 to a specific client device 104 as identified in the copy of the data. The copy of the data defining the IP address associated with the domain name may be sent to the firewall device 112 from the DNS resolver 110 based at least in part on the receiving, from the client device 104, the DNS query including the request for the IP address associated with the domain name. Thus, the client device's DNS query to the DNS resolver 110 may trigger the copying of the DNS resolution results 302 to the firewall device 112.

Further, in one example, the copy of the data sent to the firewall device 112 may also include at least one additional IP address associated with the domain name. The additional IP address may be associated with a subdomain under the domain name identified in the DNS query from the client device 104. In one example, the method 600 may also include receiving, from the client device 104, a notification of an association between the client device 104 and the firewall device 112. In this example, the sending of the copy of the data to the firewall device 112 may be performed based at least in part on an identification by the client device 104 of the firewall device 112 within the notification, with this notification acting as a trigger for the DNS resolver 110 to send the copy to the firewall device 112. The systems and methods described herein including the DNS resolver 110 and firewall device 112 may be executed within a cloud computing-based network infrastructure. Having described the systems and methods of operation of the DNS resolver 110, the operations of the entirety of the DNS server 102 will now be described in connection with FIG. 7.

Figure 7:
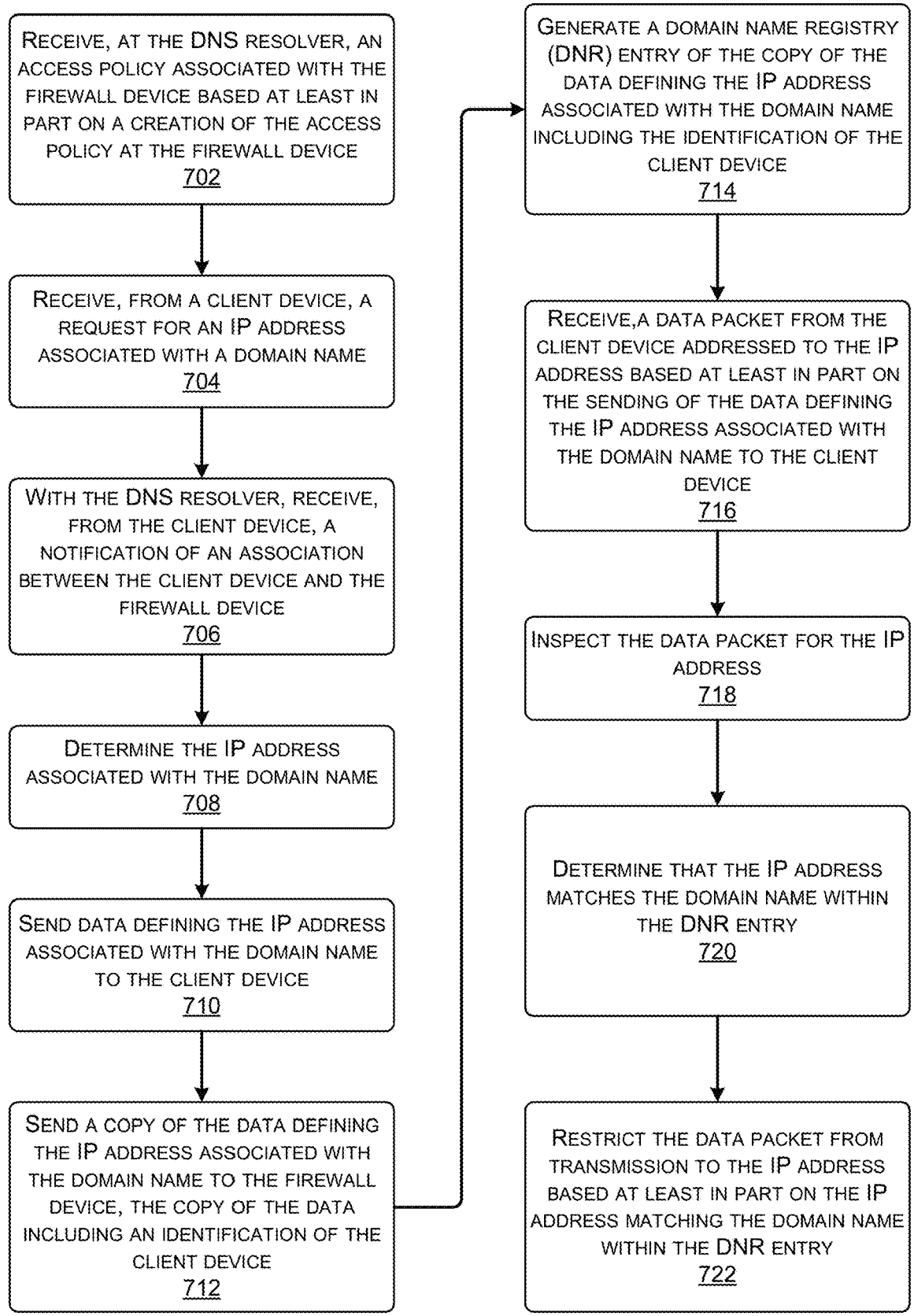
FIG. 7 illustrates a flow diagram of an example method for performing a DNS resolver-assisted domain name-based access control within a firewall device, according to an example of the principles described herein.

FIG. 7 illustrates a flow diagram of an example method 700 for performing a DNS resolver-assisted domain name-based access control within a firewall device 112, according to an example of the principles described herein. The method 700 of FIG. 7 may include, at 702, receiving, at the DNS resolver 110, an access policy associated with the firewall device 112 based at least in part on a creation of the access policy at the firewall device 112. In one example, an administrator may create the access policy at the firewall device 112. In another example, the administrator may create the access policy via a separate computing device located internal or external to DSN server 102 and sent to the firewall device 112. The firewall device 112 may store the access policy as access policy data 510 within the data store 508 of the firewall device 112.

At 704, the DNS resolver 110 receives, from the client device 104, a request for an internet protocol (IP) address associated with a domain name (e.g., a DNS query). In one example, the domain name may be a fully qualified domain name (FQDN). At 706, the DNS resolver 110 receives, from the client device 104, a notification of an association between the client device 104 and the firewall device 112 so that the DNS resolver 110 is aware of the association and can include this information in a resolution data packet sent to the firewall device 112 at firewall service 514. At 706, the DNS resolver 110 receives meta-data in the DNS query at 704 may be utilized by the resolver 110 to create the association between the client device 104 and the firewall device 112. This meta-data includes, but is not limited to, IP address of the client device 104, a type of tenant or organization identification number, and/or other identifying token. In one example, the VPN/IPsec tunnel depicted at "1" of FIG. 1 may be restricted to a single tenant or organization. In this manner, the DNS server 102 may infer that all DNS queries coming from that VPN tunnel may be associated with a single tenant, and may be sent to the firewall device 112 with this inferred information.

Thus, a copy of the data that is sent to the firewall device 112 at firewall service 514 is performed based at least in part on an identification by the client device 104 of the firewall device 112 in the notification. Because a plurality of client devices 104 may be able to communicate with a plurality of firewall devices 112, providing the data regarding the association between the client device 104 and the firewall device 112 to the DNS resolver 110 allows the DNS resolver 110 to understand which firewall device 112 the DNS resolver 110 should send the resolution data packet (e.g., as in 4 of FIG. 3). Further, in one example, when an administrator enters an access policy in the firewall and includes a domain name (e.g., DN and/or FQDN), the firewall device 112 may send configuration information defining this access policy to the DNS resolver 110. Based on the configuration information, the DNS resolver 110 may configure itself to send the copy of DNS queries received from the client device 104 for that domain name to the firewall device 112 whenever the DNS queries from that client device 104 are detected. Further, in a scenario where multiple client devices 104 are sending DNS queries to the DNS resolver 110 and/or the multiple client devices 104 are sending data packets through the firewall device 112, the configuration information may include a client device identifier to distinguish between the multiple client devices.

In one example, an administrator may restrict access to other DNS servers to ensure that the client device 104 does not circumvent the DNS resolver 110 and firewall device 112 by using a different DNS server. In one example, an entity such as a corporation may have a number of trusted DNS servers, and may block access by the client device 104 to all other DNS servers other than the trusted DNS servers. Thus, with the ability to correlate an access policy with a specific client device and correlate the client device 104 with a specific firewall device 112 within a specific DNS server 102, circumvention of the DNS resolver 110 and firewall device 112 is not permitted.

At 708, the DNS resolver 110 determines the IP address associated with the domain name, and at 710, the DNS resolver sends the data defining the IP address associated with the domain name to the client device 104. This allows the client device 104 to utilize the IP address that corresponds to the domain name in its communications with the domain name servers 308 that service that destination address within the Internet 106.

At 712, the DNS resolver 110 sends a copy of the data defining the IP address associated with the domain name to the firewall device 112 may be based at least in part on the receiving, from the client device 104, the request (e.g., the DNS query) for the IP address associated with the domain name. Further, in one example, sending the copy of the data may further include sending at least one additional IP address associated with the domain name. In this example, the additional IP address may be associated with a subdomain under the domain name. In one example, the DNS resolver 110 may provide specific information about the client device 104 (e.g., the source of the network traffic) to the firewall device 112. In this example, the DNS resolver 110 may implement techniques to identify the client device(s) 104 beyond their public/egress IP address (e.g., information that may be encoded in EDNS in the DNS query sent to the DNS resolver 110). This identifying information may be passed to the firewall device 112, where the firewall device 112 may update a number of access rules to narrowly control which client device 104 is expected to connect to which destination IP address(es).

At firewall service 514, the DNS resolver 110 also sends a copy of the data defining the IP address associated with the domain name to the firewall device 112. The copy of the data includes an identification of the client device 104. The copy of the data includes an identification of the client device 104 as well as the correlated IP address and domain name. With this information, the client device access policy 306 may be created and applied by the firewall device 112 to a specific client device 104 as identified in the copy of the data. The copy of the data defining the IP address associated with the domain name may be sent to the firewall device 112 from the DNS resolver 110 based at least in part on the receiving, from the client device 104, the DNS query including the request for the IP address associated with the domain name. Thus, the client device's DNS query to the DNS resolver 110 may trigger the copying of the DNS resolution results 302 to the firewall device 112.

In one example, the method 700 may also include receiving, from the client device 104, a notification of an association between the client device 104 and the firewall device 112. In this example, the sending of the copy of the data to the firewall device 112 may be performed based at least in part on an identification by the client device 104 of the firewall device 112 within the notification, with this notification acting as a trigger for the DNS resolver 110 to send the copy to the firewall device 112. The systems and methods described herein including the DNS resolver 110 and firewall device 112 may be executed within a cloud computing-based network infrastructure.

At 714, the firewall device 112 generates a domain name registry (DNR) entry of the copy of the data defining the IP address associated with the domain name including the identification of the client device 104. By identifying the client device 104 within the resolution data packet sent to the firewall device 112, the firewall device 112 is made aware of the client device 104 and may correlate the client device 104 with access policies created by the administrator for the client device 104. The firewall device 112 may update the access policies stored in, for example, the access policy data 510 of the data store 508 to narrowly control which client device 104 is expected to connect to which destination IP address(es).

The firewall device 112, at 716, receives a data packet from the client device 104 addressed to the IP address the DNS resolver 110 determined at 708. Thus, the data packet may be sent to the firewall device 112 based at least in part on the DNS resolver 110 sending the IP address associated with the domain name to the client device 104. The client device 104 is able to make connections with the firewall device 112 using DNS information, and the firewall device 112 may expect this communication because the firewall device 112 will know the client device's 104 information and where the DNS query request is going, so the firewall can precisely allow the transaction.

The firewall device 112, at 718, inspects the data packet sent from the client device 104 for the IP address, and, at 720, determines that the IP address matches the domain name within the DNS resolution entry 304. Matching the IP address with a domain name as included in the client device access policy 306 allows the firewall device 112 to apply a client device-specific access policy to the client device 104 that sent the data packet to the firewall device 112.

At 722, the firewall device 112 restricts the data packet from transmission to the IP address (e.g., the domain name servers 308 within the Internet) based at least in part on the IP address matching the domain name within the DNS resolution entry 304 and based at least in part on the client device access policy 306. Although the firewall device 112, in this example, is restricting the transmission of the data packet, other actions may be taken by the firewall device 112 including, for example, allowing the data packet to be transmitted, quarantining the data packet, or other actions that may be taken by a firewall device.

As an example, where the DNS resolver 110 and the firewall device 112 are configured to operate using domain names as described herein, the operations described herein also work for all sub-domains (e.g., FQDNs) as well. This is because the firewall device 112 can easily parse the "www.example.com" and make it part of an access policy for "example.com." As a first example, a first client device 104 may be allowed to access example.com while a second client device is not allowed to access "example.com." The above processes are executed, but when the second client device 104 makes the DNS query to the DNS resolver 110, the exact same information may be sent to the second client device 104 as was sent to the first client device 104. However, when the first client device 104 attempts to access the domain, the firewall device 112 will block the first client device 104 based on the access policy that the second client device may not access that domain and because the firewall device 112 now has access to not just a specific IP address in its blacklist/whitelist, but also the domain name as well that are used to preclude the access of the domain via a different IP address.

In another example, both the first client device and the second client device 104 may be allowed to access the domain presented in the DNS query to the DNS resolver 110. The first client device 104 may be provided a first IP address and the second client device may be provided a second IP address, both for the same domain. Because the firewall device 112 has information about the IP address that corresponds to the domain name in the two separate DNS queries from the first and second client devices 104, the first client device 104 and the second client device 104 would only be able to access the domain via the respective IP addresses because the firewall device 112 only allows access via those specific but different IP addresses. Thus, the firewall device 112 would not provide access to the first and second client devices via a super-set of IP addresses that all users may be given.

Figure 8:
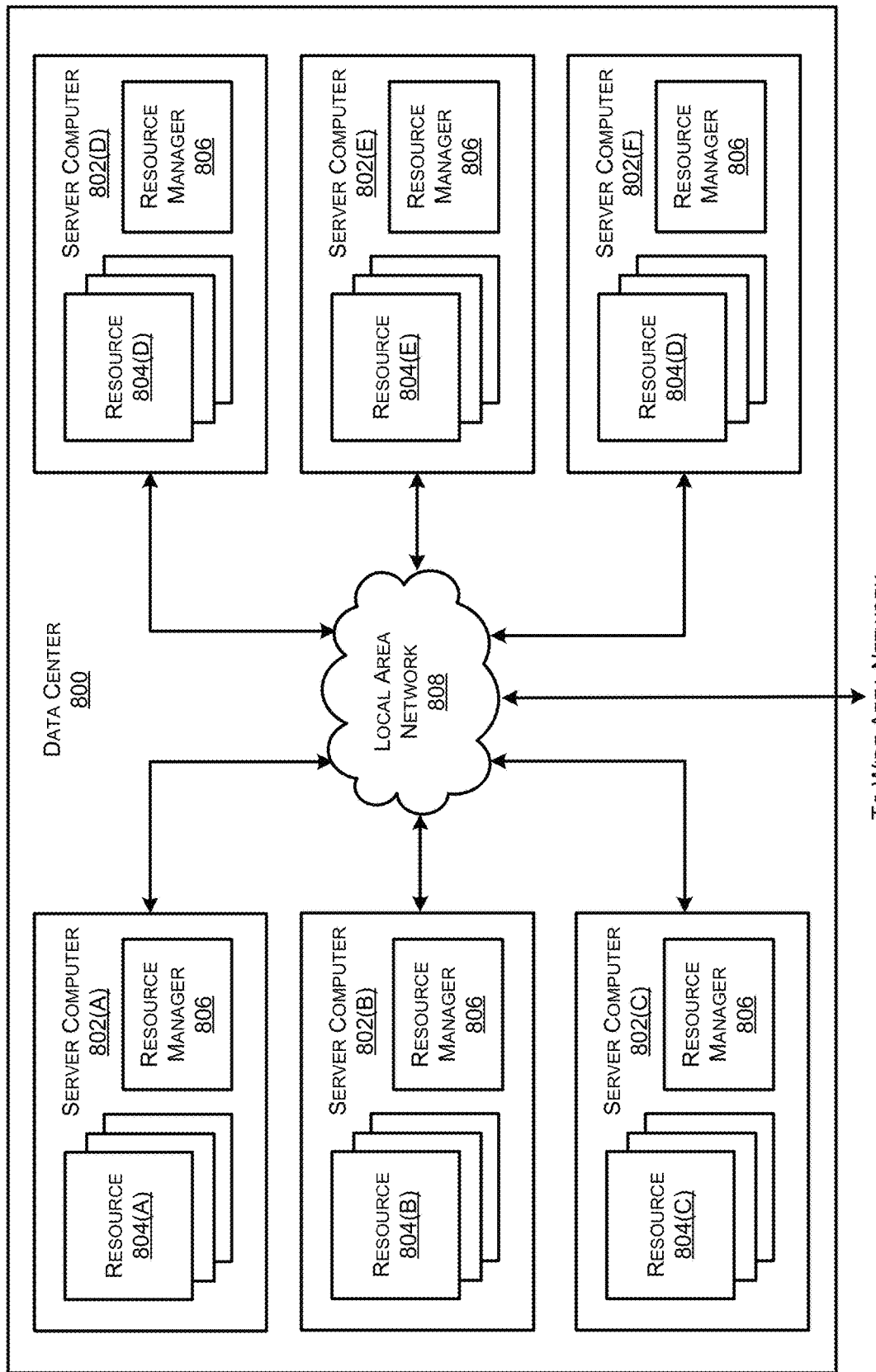
FIG. 8 illustrates a computing system diagram illustrating a configuration for a data center that may be utilized to implement aspects of the technologies disclosed herein.

FIG. 8 illustrates a computing system diagram illustrating a configuration for a data center 800 that may be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, any type of networked device described herein. Although described as servers, the server computers 802 may comprise any type of networked device, such as servers, switches, routers, hubs, bridges, gateways, modems, repeaters, access points, etc.

The server computers 802 may be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, virtual private networks (VPNs), and others. Some of the server computers 802 may also be configured to execute a resource manager 806 capable of instantiating and/or managing the computing resources. In the case of VM instances, for example, the resource manager 806 may be a hypervisor or another type of program configured to enable the execution of multiple VM instances on a single server computer 802. Server computers 802 in the data center 800 may also be configured to provide network services and other types of services.

In the example data center 800 shown in FIG. 8, an appropriate LAN 808 is also utilized to interconnect the server computers 802A-802F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 800, between each of the server computers 802A-802F in each data center 800, and, potentially, between computing resources in each of the server computers 802. It may be appreciated that the configuration of the data center 800 described with reference to FIG. 8 is merely illustrative and that other implementations may be utilized.

In some examples, the server computers 802 and or the computing resources 804 may each execute/host one or more tenant containers and/or virtual machines to perform techniques described herein.

In some instances, the data center 800 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 804 provided by the cloud computing network may include various types of computing resources, such as data processing resources like tenant containers and VM instances, data storage resources, networking resources, data communication resources, network services, VPN instances, and the like.

Each type of computing resource 804 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 804 not mentioned specifically herein.

The computing resources 804 provided by a cloud computing network may be enabled in one example by one or more data centers 800 (which might be referred to herein singularly as "a data center 800" or in the plural as "the data centers 800). The data centers 800 are facilities utilized to house and operate computer systems and associated components. The data centers 800 typically include redundant and backup power, communications, cooling, and security systems. The data centers 800 may also be located in geographically disparate locations. One illustrative example for a data center 800 that may be utilized to implement the technologies disclosed herein is described herein with regard to, for example, FIGS. 1 through 5.

Figure 9:
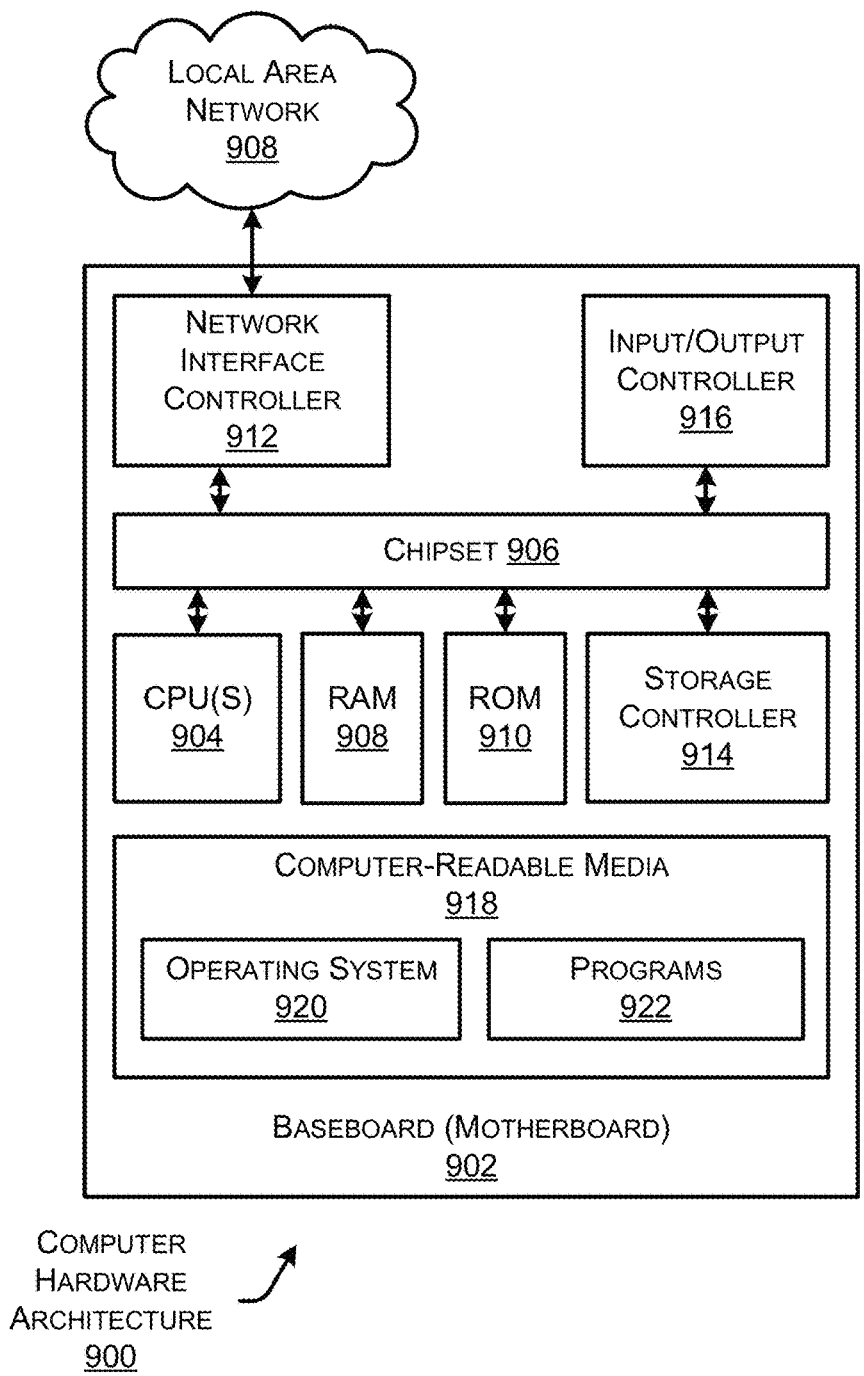
FIG. 9 illustrates a computer architecture diagram showing an example computer hardware architecture for implementing a computing device that may be utilized to implement aspects of the various technologies presented herein.

FIG. 9 illustrates a computer architecture diagram showing an example computer hardware architecture 900 for implementing a computing device that may be utilized to implement aspects of the various technologies presented herein. The computer hardware architecture 900 shown in FIG. 9 illustrates the DNS resolver 110, the firewall device 112, the VPN concentrator 108, the NAT device 114, the client devices 104, the DNS-layer security service 202, the secure internet gateway service 204, and/or other systems or devices associated with the DNS server 102 and/or remote from the DNS server 102, a workstation, a desktop computer, a laptop, a tablet, a network appliance, an e-reader, a smartphone, or other computing device, and may be utilized to execute any of the software components presented herein. The computer 900 may, in some examples, correspond to a network device (e.g., the DNS resolver 110, the firewall device 112, the VPN concentrator 108, the NAT device 114, the client devices 104, the DNS-layer security service 202, and/or the secure internet gateway service 204 (and associated devices) described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices may be connected by way of a system bus or other electrical communication paths. In one illustrative configuration, one or more central processing units (CPUs) 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory (ROM) 910 or non-volatile RAM (NVRAM) for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the DNS server 102 and the Internet 106. The chipset 906 may include functionality for providing network connectivity through a Network Interface Controller (NIC) 912, such as a gigabit Ethernet adapter. The NIC 912 is capable of connecting the computer 900 to other computing devices within the DNS server 102 and external to the DNS server 102. It may be appreciated that multiple NICs 912 may be present in the computer 900, connecting the computer to other types of networks and remote computer systems. In some examples, the NIC 912 may be configured to perform at least some of the techniques described herein, such as packet redirects and/or other techniques described herein.

The computer 900 may be connected to a storage device 918 that provides non-volatile storage for the computer. The storage device 918 may store an operating system 920, programs 922, and data, which have been described in greater detail herein. The storage device 918 may be connected to the computer 900 through a storage controller 914 connected to the chipset 906. The storage device 918 may consist of one or more physical storage units. The storage controller 914 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 900 may store data on the storage device 918 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 918 is characterized as primary or secondary storage, and the like.

For example, the computer 900 may store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the storage device 918 by detecting the physical states or characteristics of one or more particular locations within the physical storage units.

In addition to the storage device 918 described above, the computer 900 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 900. In some examples, the operations performed by the DSN server 102 and or any components included therein, may be supported by one or more devices similar to computer 900. Stated otherwise, some or all of the operations performed by the DSN server 102, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 918 may store an operating system 920 utilized to control the operation of the computer 900. According to one example, the operating system 920 comprises the LINUX operating system. According to another example, the operating system comprises the WINDOWS® SERVER operating system from MICROSOFT Corporation of Redmond, Washington According to further examples, the operating system may comprise the UNIX operating system or one of its variants. It may be appreciated that other operating systems may also be utilized. The storage device 918 may store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various processes described above with regard to FIGS. 1-7. The computer 900 may also include computer-readable storage media having instructions stored thereupon for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, or other type of output device. It will be appreciated that the computer 900 might not include all of the components shown in FIG. 9, may include other components that are not explicitly shown in FIG. 9, or might utilize an architecture completely different than that shown in FIG. 9.

As described herein, the computer 900 may comprise one or more of the DNS resolver 110, the firewall device 112, the VPN concentrator 108, the NAT device 114, the client devices 104, the DNS-layer security service 202, and/or the secure internet gateway service 204, and/or other systems or devices associated with the DNS server 102 and/or remote from the DNS server 102. The computer 900 may include one or more hardware processor(s) such as the CPUs 904 configured to execute one or more stored instructions. The CPUs 904 may comprise one or more cores. Further, the computer 900 may include one or more network interfaces configured to provide communications between the computer 900 and other devices, such as the communications described herein as being performed by the DNS resolver 110, the firewall device 112, the VPN concentrator 108, the NAT device 114, the client devices 104, the DNS-layer security service 202, and/or the secure internet gateway service 204, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for an DNS resolver 110 and firewall device 112 and provides services of the DNS server 102 as described herein. The programs 922 may enable the devices described herein to perform various operations.

The systems and methods described herein create a linkage between a firewall device 112 and a DNS resolver 110 so that domain names may be used accurately and safely in the construction of access policies or rules. This is done in a scalable and efficient manner and is completely transparent to everything except the DNS resolver 110 and the firewall device 112, so that it is backwards compatible and requires no changes to the client device(s) 104 or networks.

Further, endpoint assisted FQDN access control requires an endpoint agent to be installed on all participating devices on the network. This is impractical for unmanaged devices (guests) and internet of things (IOT) devices. Thus, the systems and methods described herein reduce or eliminate this requirement.

Further, DNS snooping assisted FQDN access control requires additional processing by the firewall device to inspect and analyze DNS traffic, and it fails in the case of encrypted DNS (such as dnscrypt, DNS over HTTPS (DOH), and DNS over TLS (DoT)). The systems and methods described herein reduce or eliminate the need for the firewall device 112 to engage in this additional processing.

Further, uniform resource locator (URL) filtering is limited to hypertext transfer protocol (HTTP) and hypertext transfer protocol secure (HTTPS) traffic. In the case of HTTPS traffic requires computationally expensive and sometimes undesirable secure sockets layer (SSL)/transport layer security (TLS) decryption. The systems and methods described herein are not limited to HTTP and HTTPS protocols and does not require additional decryption of the traffic.

URL or domain based content category filtering is effective in some cases, but may be limited to the corpus of known and categorized destinations on the internet. For many destinations on the internet, a content category is not available. The systems and methods described herein reduce or eliminate this issue.

Application based access policies are effective but limited to the corpus of known applications. The systems and methods described herein do not require an application definition to exist or a custom definition to be created.

DNS lookup techniques may not determine with high fidelity the exact IP address(es) that a client device may use to connect to a destination (e.g., DN or FQDN) at any given time. Consequently, the access policy is "padded" with IP addresses that may no longer be in use by that FQDN by extending the TTL. However, the firewall device cannot know this with certainty, and must either err on the side of being too lenient, or too restrictive. The systems and methods described herein reduce or eliminate this issue.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A domain name system (DNS) resolver comprising:
   a processor; and
   a non-transitory computer-readable media storing instructions that, when executed by the processor, cause the processor to perform operations comprising:
   receiving, from a client device, a request for an internet protocol (IP) address associated with a domain name;
   determining the IP address associated with the domain name;
   sending first data defining the IP address associated with the domain name to the client device;
   receiving, from the client device, a notification of an association between the client device and a firewall device from a plurality of firewall devices that the client device can communicate with;
   sending second data defining the IP address associated with the domain name to the firewall device based at least in part on the receiving of the notification from the client device, the second data including an identification of the client device;
   creating an access policy based at least in part on the association between the client device and the firewall device; and
   based at least in part on receiving a data packet from the client device addressed to the IP address, instructing the firewall device to:
   inspect the data packet for the IP address to determine if the IP address matches the domain name within an entry of a domain name registry (DNR) defining the IP address associated with the domain name including the identification of the client device, wherein the DNR entry is generated in response to receiving the request from the client device;
   in response to determining that the IP address matches the domain name within the DNR entry, allow the data packet to be transmitted based at least in part on the access policy and the IP address matching the domain name, and
   in response to determining that the IP address does not match the domain name within the DNR entry, restrict the data packet from transmission to the IP address.

2. The DNS resolver of claim 1, wherein the second data defining the IP address associated with the domain name is sent to the firewall device based at least in part on the receiving, from the client device, the request for the IP address associated with the domain name.

3. The DNS resolver of claim 1, wherein sending the second data further includes sending at least one additional IP address associated with the domain name, the additional IP address being associated with a subdomain under the domain name.

4. The DNS resolver of claim 1, wherein the domain name is a fully qualified domain name (FQDN).

5. The DNS resolver of claim 1, wherein the DNS resolver and the firewall device are executed within a cloud computing-based network infrastructure.

6. The DNS resolver of claim 1, further comprising restricting the data packet from transmission to the IP address based at least in part on the access policy not including the association between the client device and the firewall.

7. A domain name system (DNS) server, comprising:
   a DNS resolver;
   a firewall device communicatively coupled to the DNS resolver;
   a processor; and
   a non-transitory computer-readable media storing instructions that, when executed by the processor, cause the processor to perform operations comprising:
   with the DNS resolver:
   receiving, from a client device, a request for an internet protocol (IP) address associated with a domain name;
   determining the IP address associated with the domain name;
   sending first data defining the IP address associated with the domain name to the client device;
   receiving, from the client device, a notification of an association between the client device and a firewall device from a plurality of firewall devices that the client device can communicate with;
   sending second data defining the IP address associated with the domain name to the firewall device based at least in part on the receiving of the notification from the client device, the second data including an identification of the client device; and
   creating an access policy based at least in part on the association between the client device and the firewall device; and
   with the firewall device:
   generating a domain name registry (DNR) entry of the second data defining the IP address associated with the domain name including the identification of the client device;
   receiving a data packet from the client device addressed to the IP address based at least in part on the sending of the first data defining the IP address associated with the domain name to the client device;
   inspecting the data packet for the IP address to determine if the IP address matches the domain name;
   determining if the IP address matches the domain name within the DNR entry;

in response to determining that the IP address matches the domain name within the DNR entry, allowing the data packet to be transmitted based at least in part on the access policy and the IP address matching the domain name, and in response to determining that the IP address does not match the domain name within the DNR entry, restricting the data packet from transmission to the IP address.

8. The DNS server of claim 7, wherein the sending of the second data defining the IP address associated with the domain name is sent to the firewall device based at least in part on the receiving, from the client device, the request for the IP address associated with the domain name.

9. The DNS server of claim 7, wherein sending the second data further includes sending at least one additional IP address associated with the domain name, the at least one additional IP address being associated with a subdomain under the domain name.

10. The DNS server of claim 7, wherein the domain name is a fully qualified domain name (FQDN).

11. The DNS server of claim 7, wherein the DNS server including the DNS resolver and the firewall device includes a cloud computing-based network infrastructure.

12. A non-transitory computer-readable medium storing instructions that, when executed, cause a processor to perform operations, comprising, with a firewall device communicatively coupled to a DNS resolver:

generating a domain name registry (DNR) entry of first data defining an internet protocol (IP) address associated with a domain name based at least in part on a DNS query request from a client device, the first data defining the internet protocol (IP) address associated with the domain name being sent from the DNS resolver;

creating an access policy based at least in part on an association between the client device and the firewall device as defined by a notification received from the client device defining the association between the client device and the firewall device, wherein the firewall device is one of a plurality of firewall devices that the client device can communicate with;

receiving second data defining the IP address associated with the domain name based at least in part on the receiving of the notification from the client device, the second data including an identification of the client device;

receiving a data packet from the client device addressed to the IP address;

inspecting the data packet for the IP address to determine if the IP address matches the domain name;

determining if the IP address matches the domain name within the DNR entry;

in response to determining that the IP address matches the domain name within the DNR entry, allowing the data packet to be transmitted based at least in part on the access policy and the IP address matching the domain name, and in response to determining that the IP address does not match the domain name within the DNR entry, restricting the data packet from transmission to the IP address.

13. The non-transitory computer-readable medium of claim 12, the operations further comprising:

receiving an access policy, the access policy identifying the domain name; and sending the access policy to the DNS resolver.

14. The non-transitory computer-readable medium of claim 13, wherein the access policy is at least one of a layer-3 access policy and a layer-4 access policy.

15. The non-transitory computer-readable medium of claim 12, wherein the receiving the data packet from the client device is based at least in part on the DNS resolver sending the second data defining the IP address associated with the domain name to the client device.

16. The non-transitory computer-readable medium of claim 12, wherein:

the domain name is a fully qualified domain name (FQDN), and the first data further includes at least one additional IP address associated with the domain name, the additional IP address being associated with a subdomain under the domain name.

17. The non-transitory computer-readable medium of claim 12, wherein the DNS resolver and firewall device are executed within a cloud computing-based network infrastructure.

* * * * *